United States Patent [19]

Takabatake

[11] Patent Number: 5,071,631

[45] Date of Patent: Dec. 10, 1991

[54] POROUS CARBON-CARBON COMPOSITE AND PROCESS FOR PRODUCING THE SAME

[75] Inventor: Minoru Takabatake, Ibarakiken, Japan

[73] Assignee: Petoca Ltd., Tokyo, Japan

[21] Appl. No.: 453,257

[22] Filed: Dec. 20, 1989

Related U.S. Application Data

[63] Continuation-in-part of Ser. No. 247,237, Sep. 21, 1988, abandoned.

[30] Foreign Application Priority Data

Sep. 22, 1987 [JP] Japan .................................. 62-238222

[51] Int. Cl.$^5$ .............................................. C01B 31/02
[52] U.S. Cl. ...................................... 423/445; 423/449; 264/29.1; 264/29.5
[58] Field of Search ............... 423/445, 449; 264/29.1, 264/29.5, 45.3

[56] References Cited

U.S. PATENT DOCUMENTS

| | | | |
|---|---|---|---|
| 2,799,052 | 7/1957 | Stroup | 423/449 |
| 3,283,040 | 11/1966 | Stover | 423/449 |
| 3,419,645 | 12/1968 | Pietzka et al. | 264/29.5 |
| 3,558,276 | 1/1971 | Otani | 423/449 |
| 3,814,642 | 6/1974 | Araki et al. | 423/447.1 |
| 3,888,958 | 6/1975 | Juntgen et al. | 423/449 |
| 3,957,957 | 5/1976 | Newman et al. | 264/29.5 |
| 4,005,181 | 1/1977 | Hill et al. | 423/449 |
| 4,013,760 | 3/1977 | Huschka et al. | 423/449 |
| 4,198,382 | 4/1980 | Matsui et al. | 423/449 |
| 4,205,055 | 5/1980 | Maire et al. | 423/449 |
| 4,434,206 | 2/1984 | Fukuda et al. | 264/29.1 |

FOREIGN PATENT DOCUMENTS

| | | | |
|---|---|---|---|
| 49-40078 | 10/1974 | Japan | 423/449 |
| 59-107913 | 12/1982 | Japan . | |

*Primary Examiner*—Robert Kunemund
*Attorney, Agent, or Firm*—Armstrong, Nikaido, Marmelstein, Kubovcik & Murray

[57] ABSTRACT

A porous isotropic carbon-carbon composite having a porosity of 25 to 85% and substantially isotropic mechanical strength, and containing 60% by weight or more of aggregate particles having an aspect ratio of 10 or smaller and reinforced in one direction with carbon fiber is provided.

4 Claims, No Drawings

POROUS CARBON-CARBON COMPOSITE AND PROCESS FOR PRODUCING THE SAME

This application is a continuation-in-part of application Ser. No. 247,237, filed Sept. 21, 1988, now abandoned.

BACKGROUND OF THE INVENTION

1. Field of the Invention

This invention relates to a porous isotropic carbon-carbon composite having a carbon fiber as a reinforcement material, and a process for producing such a porous isotropic carbon-carbon composite. More particularly, it relates to a porous isotropic carbon-carbon composite having a suitable porosity, a substantially isotropic mechanical strength, and superior properties in resistance to heat, chemicals and abrasion, etc., and a process for producing the same.

A carbon-carbon composite produced according to the process of the present invention is useful as a filter element material, a catalyst carrier, an electrode for fuel batteries, a bearing part, a dry cell part, and a storage battery part, etc.

2. Prior Art

It is known that a porous isotropic carbon-carbon composite can be obtained by effervescing impregnation of a liquid carbonizable material into a reinforcement material of a high strength high modulus carbon fiber while the carbon fiber is wound to a desired shape, or into a material of a structure having a high strength, high modulus carbon fiber as its principal material, e.g. woven fabrics, three-dimensional woven fabrics, non-woven fabrics, unidirectionally oriented sheets, or by cutting a reinforcing material of a high strength high modulus carbon fiber short, mixing a liquid carbonizable material therewith and causing it to foam, and carbonizing the liquid carbonizable material that is a precursor of carbon matrix under inert atmosphere and, if necessary, graphitizing the carbonized product.

The problem of this method is difficulty of isotropical orientation of the reinforcement material. Thus, the strength of the composite material differs dramatically direction to direction, and in many cases, products of the composite material have a weak point, and it is necessary to handle them as a fragile thing. Also, distribution and orientation of pores tend to be ununiform. This is considered as one of the reasons why the strength of such a composite material differs direction to direction.

In order to solve this problem, it has been carried out in prior art method to cut a reinforcing fiber very short or to make the proportion of the content of a reinforcement fiber smaller. However, there is a problem in this method that the effectiveness of the use of this reinforcement material is not sufficient. As an alternative solution, a method is proposed in which very fine glass hollow cubes are mixed. However, this leads to introduction of impurities into a composite after carbonization, as well as reduction of electric properties and corrosion resistance. Also, there is a problem in this method that production of a continuous pore type porous composite is difficult.

As a process for producing porous carbon products which is different from the above-mentioned process, there is disclosed in U.S. Pat. No. 3,829,327 a method in which a web of a carbon fiber is coated with pyrolytic carbon formed by CVD process. This method has an advantage of forming products superior in chemical and electrical properties, but there are problems that this method is costly and strength is notably reduced if a carbon material having a large porosity is made.

Also, in U.S. Pat. No. 3,991,169, a process wherein a higher alcohol is caused to adhere to a pitch fiber mat to help local melt-adhesion of a pitch fiber is disclosed. But this method has a problem that a product having a high mechanical strength is difficult.

Also, U.S. Pat. No. 3,960,601 discloses a fibrous web obtained by infusiblization and carbonization treatment of a pitch fiber web produced by blow-spinning. However, a porous carbon material produced by this method is essentially an aggregate of a fiber and pore size is small. If it is attempted to make the porosity larger, there is a problem that its mechanical strength is reduced.

It is an object of the present invention to solve the problem of difficulty of handling during molding and carbonization of a porous carbon-carbon composite, which difficulty is caused by notable weakness in properties such as mechanical strength in a certain direction due to notable directional properties (anisotropy) of the reinforcement material.

The above-mentioned object can be accomplished by the process of the present invention.

SUMMARY OF THE INVENTION

The present invention resides in a porous isotropic carbon-carbon composite which is characterized by containing 60% by weight or more of aggregate particles reinforced unidirectionally by a carbon fiber having an aspect ratio of 10 or smaller, and which has a porosity of 25-65% and is substantially isotropic in mechanical strength.

The production process of the present invention comprises impregnating an unidirectionally arranged reinforcement material of an infusiblized pitch fiber or a pitch-based carbonaceous fiber carbonized at a temperature of 2200° C. or lower with a liquid carbonizable material such as a pitch, and carbonizing them at a temperature of 2200° C. or lower to give an unidirectionally reinforced carbon-carbon composite, grinding the composite to aggregate particles so that they have a particle size of 5-325 mesh and an aspect ratio of 10 or smaller, blending 60% to 90% by weight of the aggregate particles with to 10% by weight of a pitch having a softening point of 220° C. or higher, pressure molding the blend at a temperature in the range of 5° to 100° C. lower than the softening point of the pitch and at a pressure in the range of 80 to 400 kg/cm$^2$, and carbonizing the resulting molded product and, if necessary, further graphitizing the carbonized product to give a product having a porosity of 25 to 65% and isotropic mechanical strength.

The carbonaceous fiber used in the present invention is preferably those carbonized at a temperature of 1000° C. or lower. As the carbonization temperature is increased, there is a tendency that the strength of the carbon fiber is greater. Accordingly, an unidirectionally reinforced carbon-carbon composite prepared by using such a carbon fiber as reinforcement material is apt to split parallel in the direction of fiber axis and it is difficult to obtain particles having a small aspect ratio. Most preferably, a carbonization temperature is 800° C. or lower. It is also preferred to use a pitch fiber which has been subjected to only infusiblization treatment.

The carbonization temperature of the unidirectionally reinforced carbon-carbon composite is preferably in the range of 400° to 1400° C. and most preferably in the range of 600-1000° C. If the carbonization temperature of the too high, there is a problem of lack of adhesivity between the composite and a pitch in the next step. If the carbonization temperature is too low, there is a problem of great dimensional change and processing difficulty in the next molding step with pitch and in the carbonization step.

Particles after grinding have particle size of 5-325 mesh and aspect ratio of 10, preferably particle size of 20-200 mesh and aspect ratio of not higher than 3.0. When particles are too large, it is difficult to obtain sufficient adhesivity in the next molding step with a pitch, and when particles are too small, there is a problem of difficulty in obtaining high porosity.

A method for blending a pitch having a high softening point with ground aggregate particles includes one in which both the materials in powder forms are blended, one in which aggregate particles are sprayed with a molten pitch, and one in which aggregate particles are intermixed into a molten pitch and they are solidified and crushed. A suitable blending method seems to depend on the blending ratio of the pitch. After a blend of aggregate particles which are powder of a carbon-carbon composite and a pitch having a high softening point is molded at a temperature in the range of 5° to 100° C. lower than the softening point of the pitch at a pressure in the range of of 80-400 kg/cm$^2$, it is carbonized. A carbonization temperature is preferably lower than the softening point of the pitch by 10° to 50° C. Molding pressure of 100 to 300 kg/cm$^2$ is preferred. The values of the softening point of the pitch were obtained by measurements using Koka type flow tester.

The measurements with a Koka type flow tester (manufactured by Shimazu Seisakusho) is carried out as follow.

Firstly, a sample is inserted into a heating block, pressed to 10 kg/cm$^2$, and temperature is elevated at a rate of 6° C./min, and a specific volume curve is measured. The apparent specific volume decreases with elevation of the temperature, and in a certain temperature range, the decrease of the specific volume becomes extremely small, and the volume change substantially stops. If the temperature is raised further, the sample flows out from a nozzle and the sample volume decreases. A softening point is obtained as an intersection point of two straight lines one of which is approximating the curve in the temperature range where there is no volume change and the other of which is approximating the curve in the range lower than the above-mentioned range.

Molding pressure can be controlled so that the porosity after carbonization is in the range of 25 to 65%. A porosity greater than 65% is not preferred because mechanical strength is drastically reduced. Neither a porosity lower than 25% is preferred because unevenness of porosity is caused by too much compression.

The porous isotropic carbon-carbon composite material of the present invention is approximately isotropic in mechanical strength. It is possible to make a composite of the present invention so that the maximum value of mechanical strength in a direction does not exceed twice the value of minimum mechanical strength in a direction. If molding condition is suitably selected, this maximum/minimum ratio can be reduced to 1.5 times or smaller.

In order to sufficiently improve resistance to heat and chemicals and the like of the composite, it is preferred to carry out carbonization and graphitization at a temperature of 1000° C. or higher.

The carbon fiber used as a raw material of the porous isotropic carbon-carbon composite of the present invention may be of any type. Those which show small difference in dimensional change from that of the precursor of carbon matrix at the time of carbonization and graphitization are preferred. Pitch-based carbon fibers, particularly those which are produced from an optically anisotropic pitch are more preferred than carbon fibers produced from PAN type synthetic fibers.

EXAMPLE 1

A petroleum pitch based carbon fiber carbonized at 600° C. is arranged unidirectionally and impregnated with a petroleum pitch having a softening point of 185° C. and carbonized at 1000° C. By grinding the resulting carbon-carbon composite, a powder having an average particle size of 150 mesh and aspect ratio of 1.1 was obtained.

Eighty-two parts of this powder as aggregate particles and 18 parts of a petroleum pitch having a softening point of 235° C. ground to an average particle size of 200 mesh were blended. The resulting blend was charged to a plate shaped mould having a thickness of 10 mm, and shaped at a temperature of 200° C. and a pressure of 210 kg/cm$^2$.

The resulting product was carbonized under atmosphere of an inert gas at an atmospheric pressure by successively elevating the temperature at 10° C./hour up to 1000° C. The resulting carbon material had a porosity of 52%, flexural strength of 285 kg/cm$^2$ in the direction of the surface of the plate and 254 kg/cm$^2$ in the direction of the thickness of the plate.

EXAMPLE 2

The average particle diameter and the and the aspect ratio were varied by changing the carbonization condition of the reinforcement fiber of example 1 and grinding condition of the unidirectionally reinforced carbon-carbon composite. A pitch powder was blended with each of the resulting aggregate particles as in example 1, and after pressure molding at a temperature 35° C. lower than the softening point of the pitch carbonization was carried out. Characteristic properties of the resulting porous carbon-carbon composite are shown in Table 1. Blending ratio of the aggregate particles to the pitch powder was 70:30.

The maximum strength was determined by using a "three points bending test" essentially in accordance with ASTM D 790-86 using specimens having the physical characterization L40×W4×T3 mm, using a 30 mm span distance. Minimum strength was determined using the three points test using a specimen having the physical characteristics L10×W3×T0.6 mm at a span of 6 mm (essentially according to ASTM D 790-86). See page 388, formula (3).

Porosity was determined by measuring the differences between the weight of the dry product and the weight of the product after submersion in a liquid.

Aspect ratio can be determined by using Scanning Electron Micrograph pictures of the fibers.

Average particle diameter was determined using sieves having pass-through characteristics as defined infra.

| Mesh | Largest Mesh | Smallest Mesh |
| --- | --- | --- |
| 4 | — | 5 |
| 10 | 5 | 15 |
| 150 | 120 | 170 |
| 280 | 240 | 320 |
| 400 | 320 | 500 |

TABLE 1

| | Aggregate particle size and properties of porous composite | | | | | |
| --- | --- | --- | --- | --- | --- | --- |
| | Size of aggregate particle | | Properties of porous Composite | | | |
| | average | | | | | |
| Test Number | particle diameter mesh | aspect ratio | maximum strength kg/cm$^2$ | minimum strength kg/cm$^2$ | Max/Min | Note |
| Comparative example 1 | 4 | 1.6 | 75 | 52 | 1.44 | |
| 2 | 10 | 1.0 | 188 | 127 | 1.48 | |
| 3 | 150 | 1.1 | 280 | 265 | 1.06 | |
| 4 | 280 | 1.4 | 245 | 230 | 1.07 | |
| Comparative example 5 | 400 | 1.6 | 228 | 217 | 1.05 | low porosity |
| 6 | 150 | 4.1 | 290 | 191 | 1.52 | |
| Comparative example 7 | 150 | 15.0 | 297 | 113 | 2.63 | |

Effectiveness of the present invention

A porous isotropic carbon-carbon composite produced according to the process of the present invention is able to have a greater fiber content than those produced by a conventional method, and has a greater strength and indicates an isotropic mechanical strength.

What is claimed is:

1. A porous isotropic carbon-carbon composite characterized by having a porosity of 25 to 65%, having substantially isotropic mechanical strength, and containing 60% by weight or more of aggregate particles, said aggregate particles having an aspect ratio of 10 or less and being reinforced unidirectionally by carbon fibers.

2. A process for producing a porous isotropic carbon-carbon composite, comprising impregnating a reinforcement material of a pitch fiber having been subjected to infusiblization treatment or a pitch-based carbonaceous fiber carbonized at a temperature of 2200° C. or lower, said reinforcement material being arranged unidirectionally, with a liquid carbonizable material, carbonizing the impregnated reinforcement material at a temperature of 2200° C. or lower, grinding the resulting unidirectionally reinforced carbon-carbon composite so that the particle size is 5–325 mesh and the aspect ratio is 10 or smaller, blending 60% to 90% by weight of the resulting ground composite as aggregate particles with 40% to 10% by weight of a pitch having a softening point of 220° C. or higher, pressure molding the blend at a temperature in the range of 5° to 100° C lower than the softening point of said pitch and at a pressure in the range of 80 to 400 kg/cm$^2$, and carbonizing the resulting molding to give a product having a porosity of 25 to 65% and isotropic mechanical strength.

3. A process for producing a porous isotropic carbon-carbon composite, comprising impregnating a reinforcement material of pitch fiber having been subjected to infusiblization treatment or a pitch-based carbonaceous fiber carbonized at a temperature of 2200° C. or lower, said reinforcement material being arranged unidirectionally with a liquid carbonizable material, carbonizing the impregnated reinforcement material at a temperature of 2200° C. or lower, grinding the resulting unidirectionally reinforced carbon-carbon composite so that the particle size is 5–325 mesh and the aspect ratio is 10 or smaller, blending 60% to 90% by weight of the resulting ground composite as aggregate particles with 40% to 10% by weight of a pitch having a softening of 220° C. or highter, pressure molding said blend at a temperature in the range of 5 to 100° C. lower than the softening point of said pitch and at a pressure in the range of 80 to 400 kg/cm$^2$, and carbonizing and graphitizing the resulting molding to give a product having a porosity of 25 to 65% and isotropic mechanical strength.

4. A process according to claim 2 or 3 in which a liquid carbonizable material used to impregnate reinforcement material is a pitch.

* * * * *